Figure 1:
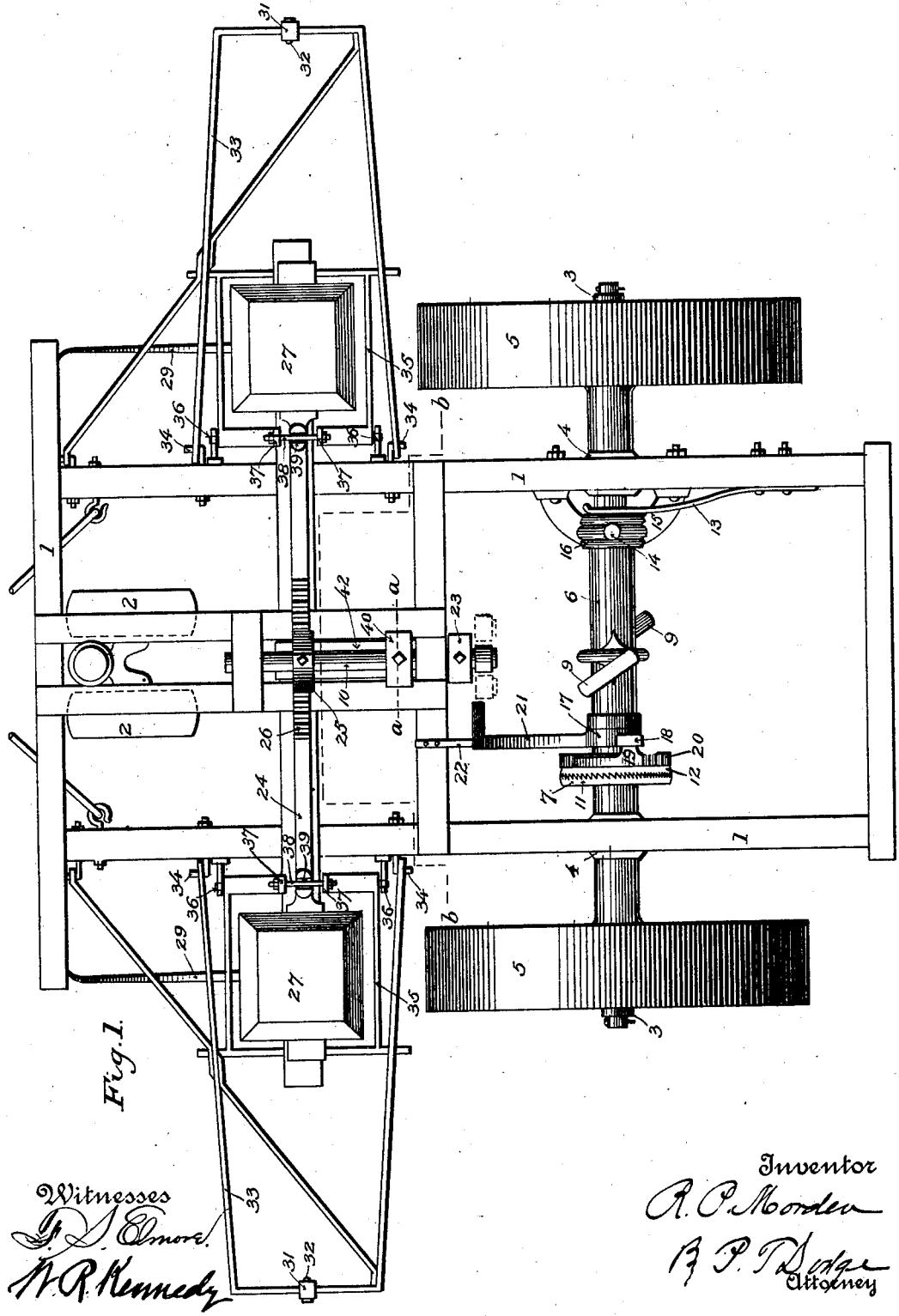

No. 676,268.

R. P. MORDEN.
CORN PLANTER.
(Application filed Oct. 9, 1900.)

(No Model.)

Patented June 11, 1901.

3 Sheets—Sheet 1.

Witnesses

Inventor
R. P. Morden
B. P. Dodge
Attorney

No. 676,268. Patented June 11, 1901.
R. P. MORDEN.
CORN PLANTER.
(Application filed Oct. 9, 1900.)
(No Model.) 3 Sheets—Sheet 2.
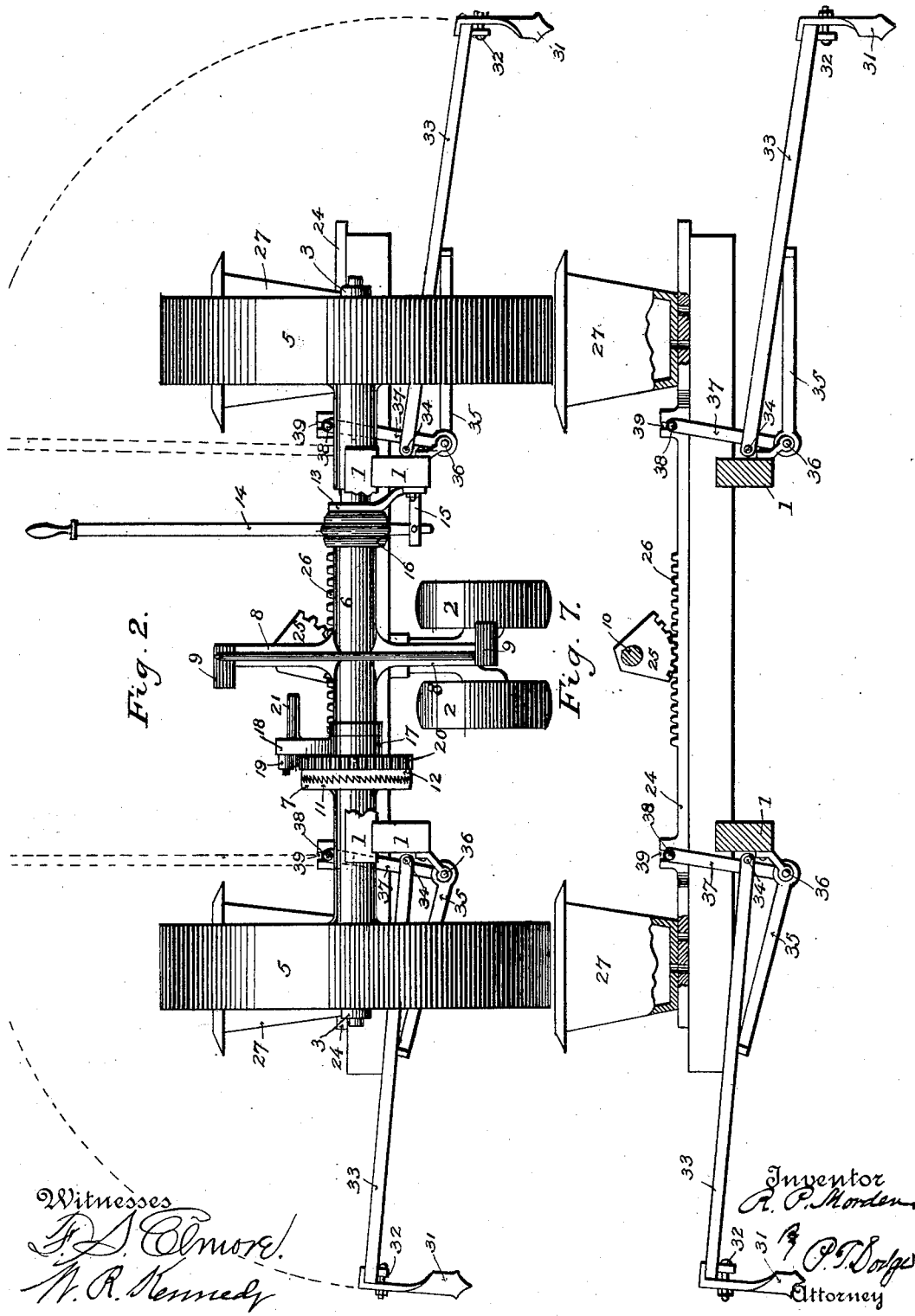
Witnesses
Inventor
Attorney No. 676,268. Patented June 11, 1901.
R. P. MORDEN.
CORN PLANTER.
(Application filed Oct. 9, 1900.)
(No Model.) 3 Sheets—Sheet 3.
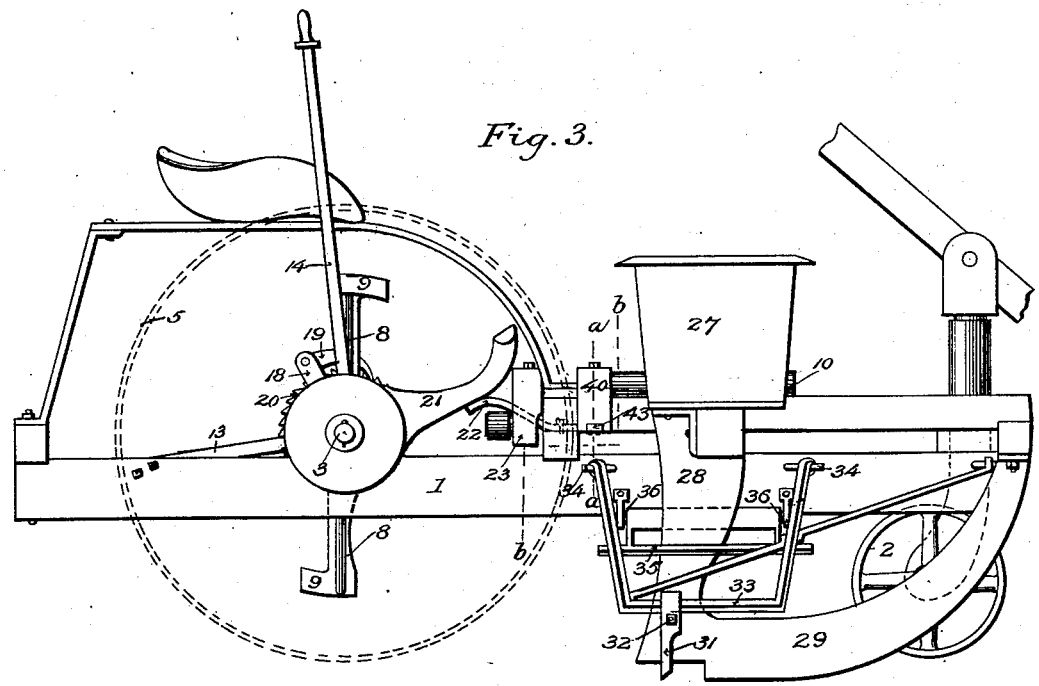
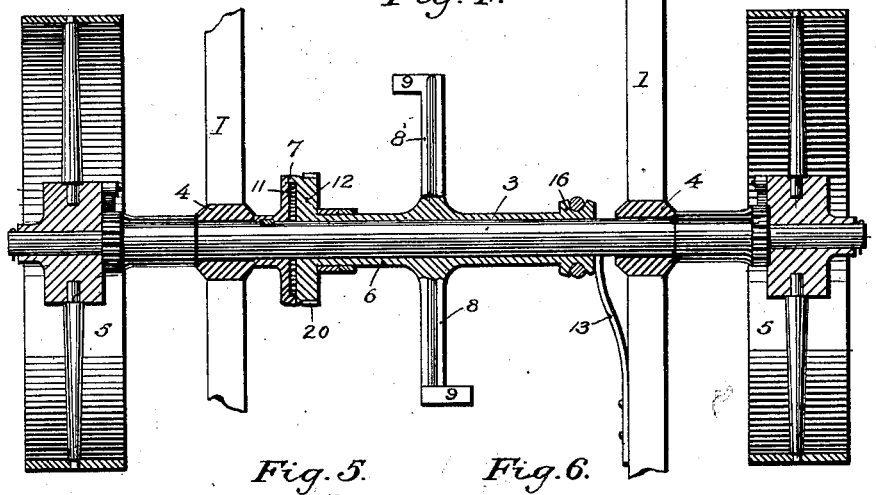
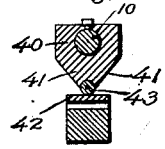
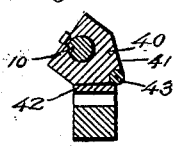

UNITED STATES PATENT OFFICE.

ROBERT P. MORDEN, OF JEFFERSON, IOWA, ASSIGNOR OF ONE-HALF TO MAHLON M. HEAD, OF SAME PLACE.

CORN-PLANTER.

SPECIFICATION forming part of Letters Patent No. 676,268, dated June 11, 1901.

Application filed October 9, 1900. Serial No. 32,516. (No model.)

*To all whom it may concern:*

Be it known that I, ROBERT P. MORDEN, of Jefferson, county of Greene, and State of Iowa, have invented a new and useful Improvement in Corn-Planters, of which the following is a specification.

This invention has reference to that class of corn-planting machines in which the planting mechanism is operated from the ground-wheels as the machine advances; and the invention embodies various improvements in the operative mechanism designed to render the operation of the machine effective and the planting of the corn accurate in uniformly-spaced hills to insure straight rows.

In the accompanying drawings, Figure 1 is a top plan view of my improved machine. Fig. 2 is a rear elevation of the same. Fig. 3 is a side elevation of the machine with one of the ground-wheels removed to expose other parts to view. Fig. 4 is a horizontal transverse section through the driving-axle and adjacent parts. Fig. 5 is a transverse vertical section on the line $a\ a$ of Figs. 1 and 3. Fig. 6 is a similar view of the parts in a different position. Fig. 7 is a transverse vertical section on the line $b\ b$ of Figs. 1 and 3, showing the seed-slide and the markers operated thereby.

Referring to the drawings, 1 represents a horizontal rectangular frame supported at its forward end by a central swiveling guide-wheel 2 and at its rear end by a driving-axle 3, mounted loosely in journal-boxes 4, fixed to the two longitudinal side bars of the frame. Ground-wheels 5 are mounted on the ends of the axle and connected thereto by the usual pawl-and-ratchet mechanism, so that the axle will be rotated only when the machine advances. At its center the axle is loosely encircled by a sleeve 6, driven from the axle by a clutch 7 and provided with two radial arms 8, having on their ends oblique plates 9, adapted by the rotation of the sleeves to impart a rocking motion to a longitudinal shaft 10, and thereby operate the seeding mechanism, as will be more fully described hereinafter.

The clutch comprises a toothed clutch member 11, fixed to and rotatable with the axle, and a toothed clutch member 12, fixed on the end of the sleeve 6, the latter being movable endwise along the axle in order to be engaged with or disengaged from the clutch member 11, as desired. This sleeve is acted on at one end by a spring 13, which tends to hold it to the left, in Fig. 1, with its toothed member engaged with the rotating member of the clutch, in which position of the parts the forward movement of the ground-wheels will impart a rotary motion to the sleeve and cause its arms to operate the seeding mechanism. The disengagement of the clutch to arrest the motion of the sleeve is effected by a vertical hand-lever 14, Fig. 2, pivoted, as at 15, to an extension on the frame and forked to embrace the grooved end 16 of the sleeve, the construction being such that a movement of this lever to the right will instantly disengage the clutch and bring the operative mechanism to rest. The main function of this lever and the parts operated thereby is to correct any inaccuracies which might occur in the dropping of the corn at the proper points by reason of the irregularities in the surface of the ground or the slip of the ground-wheels. It frequently occurs on account of such conditions that there is a gain in the operation of the seeding mechanism with reference to the advance of the machine, there being a tendency to drop the corn before the machine arrives at the proper point opposite the corresponding hill in the row. This may be corrected by operating the hand-lever 14 to disengage the clutch members and arrest momentarily the motion of the sleeve to give the machine time to reach the proper point before the sleeve is operated to actuate the dropping mechanism. It also frequently happens that the seeding mechanism loses in its action with reference to the advance of the machine and fails to plant until after the proper point for the hill is reached. This I propose to correct by providing for an independent operation of the sleeve with reference to the axle to quickly bring the arms in position to operate the seeding mechanism independently of the motion of the advancing machine. To effect this action, I mount loosely on the sleeve 6, adjacent to the clutch member 12, a collar 17, having extending upward from it an arm 18, carrying a dog 19, engaging teeth 20 on the periphery of the clutch member 12, the arrangement of the parts being such that a forward movement of the dog will turn the sleeve around on the axle. The dog is operated by a foot-lever 21, projecting forward from the collar and held normally raised by a spring 22 on the frame. It will be observed that these two devices—the one for retarding the operation of the seeding mechanism and the other for advancing the same—are independent in their actions of each other and of the motion of the driving-axle, it being possible by their operation to plant the corn accurately at the proper points, and thus insure uniform and straight rows of hills.

The longitudinal rock-shaft 10 before alluded to has on its rear end a crank-arm 23, carrying a friction-roller, which is successively engaged by the two oblique plates 9, by which the crank-arm is vibrated back and forth and imparts to the shaft its rocking motion. This motion of the shaft is caused to reciprocate a horizontal seed-slide 24, the former being provided with a segment-gear 25, Fig. 7, engaging teeth 26 on the slide. This seed-slide is adapted by its movement to deliver seed simultaneously from two seed-hoppers 27, sustained at the sides of the frame in advance of the ground-wheels and vertically over the usual conductor-tubes 28, formed in runners or furrow-openers 29.

In order that when the seed is dropped from the hoppers the field may be marked as a guide for the accurate planting of the next rows, I provide the machine on opposite sides with markers adapted to be operated by the movements of the seed-slide, and as the markers are identical in construction a description of one will suffice. The marker proper is in the form of a pointed blade 31, held frictionally by a bolt 32 to the outer end of a bail or frame 33, pivoted at its inner end, as at 34, to the frame on a horizontal fore-and-aft axis, so as to be movable freely vertically. The purpose of securing the blade frictionally to the frame is to prevent its breakage in case a stone or similar obstruction is encountered, the vertical movement of the marker-frame permitting the latter to rise to override obstructions.

The marker-frame is operated and controlled in its movements by an operating-frame 35, extending beneath the marker-frame and supporting it and pivoted to the frame of the machine, as at 36, on an axis extending parallel with the axis of the marker-frame. This operating-frame is formed with two vertical arms 37, extending at the sides of the seed-slide and connected at their upper ends by a cross-bar 38, which is seated in an open slot 39 in the upper side of the seed-slide. As a result of this construction the movements of the slide will alternately raise and lower the operating-frames at the two sides of the machine and will impart to the marker-frames corresponding movements, the marker at one side of the machine being elevated simultaneously with the descent of the opposite marker, so that marks will be made in the ground alternately on opposite sides of the machine, those on one side breaking joints with those on the opposite side.

In order that when the longitudinal shaft is rocked to operate the seed-dropping mechanism and markers, as described, the parts may be held stationary between each operation, with one of the markers in the ground, I provide an automatically-acting locking device for the shaft adapted to hold the same temporarily alternately in its two positions to right and left. This locking device is in the form of a block 40, Figs. 5 and 6, fixed to the shaft, with its lower end provided with two beveled faces 41, adapted to be engaged alternately by a flat spring 42 and held yieldingly in its two positions, as shown in Fig. 6. At the junction of the two beveled faces the block has mounted in a recess therein a friction-roller 43, which projects slightly beyond the faces, so that when the block is moved by the shaft past the center the spring acting on the roller will cause the block to move quickly to its inclined position. As a result of this arrangement it is only necessary for the arms of the sleeve 6 to give the shaft an initial movement, the latter being positively and quickly operated by the pressure of the spring on the roller carried by the block. Further, it is seen that by reason of the beveled faces the shaft is held temporarily, but yieldingly, in its two positions, so that the markers remain one elevated and the other in the ground while the machine advances from one hill to the next, the result being that marks will be made at intervals opposite the spaces between the hills. This action of the markers I propose to utilize in determining the point at which the successive hills are planted by observing if in the passage of the machine across the field the points at which the markers act in the ground with reference to the previous trip, any inaccuracies—either a gain or a loss—in the operation of the mechanism being corrected by the two devices described for arresting the motion of the sleeve and for advancing it in its action.

In transporting the machine from place to place and over roads the marker-frames, by reason of their free vertical movement, may be lifted vertically to the position represented by dotted lines in Fig. 2.

Having thus described my invention, what I claim is—

1. In a corn-planting machine the combination with the seed-slide, of the marker adapted to be raised and lowered by the movements of the slide, a rock-shaft operatively connected with the seed-slide and adapted to reciprocate the same, means for rocking the shaft, and means acting on the shaft for locking the same stationary between each rocking motion.

2. In a corn-planting machine the combination with a marker movable vertically, of a vertically-rocking operating-frame engaging beneath the marker and entirely disconnected from it, and means for rocking the operating-frame.

3. In a corn-planter the combination with the main frame, of a marker-frame pivoted at its inner end to the main frame on a horizontal fore-and-aft axis, an operating-frame extending beneath the marker-frame and pivoted to the main frame on an axis parallel to the axis of the marker-frame, an arm on the operating-frame, and a reciprocating seed-slide engaging said arm.

4. In a corn-planter the combination with the main frame, of the horizontally-reciprocating seed-slide, a marker-frame pivoted at its inner end to the main frame, an operating-frame extending beneath the marker-frame and pivoted to the main frame, two arms on the operating-frame extending vertically at the sides of the seed-slide, and a cross-bar connecting said arms and engaged by the seed-slide.

5. In a corn-planter the combination with the frame, of a longitudinal rock-shaft, means for rocking the same, a seeding mechanism operated by the rock-shaft, a block fixed to the shaft and formed with two beveled surfaces, and a spring adapted to be engaged by the two surfaces on the block; whereby the shaft will be held yieldingly in its two positions.

6. In a corn-planter the combination with the frame, of a seed-dropping mechanism, a longitudinal rock-shaft operatively connected therewith, a crank-arm on the rock-shaft, rotating arms adapted to engage the crank-arm and move the same past the center, and means acting on the shaft independently of the said arms, for continuing the initial movement given by the arms.

7. In a corn-planter the combination with the frame, of a seed-dropping mechanism, the longitudinal rock-shaft operatively connected therewith, a crank-arm on the rock-shaft, rotating arms adapted to engage the crank-arm and move the same past the center, a block fixed to the shaft and formed with two beveled surfaces, a friction-roller mounted in the block with its surface exposed at the junction of the beveled surfaces, and a spring adapted to be engaged by said friction-roller.

In testimony whereof I hereunto set my hand, this 28th day of August, 1900, in the presence of two attesting witnesses.

ROBERT P. MORDEN.

Witnesses:
C. E. MARQUIS,
H. A. WHITE.